(12) United States Patent
Sato et al.

(10) Patent No.: US 10,131,748 B2
(45) Date of Patent: Nov. 20, 2018

(54) POLYIMIDE RESIN

(71) Applicant: MITSUBISHI GAS CHEMICAL COMPANY, INC., Chiyoda-ku (JP)

(72) Inventors: Yuuki Sato, Kanagawa (JP); Jun Mitadera, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 0 days.

(21) Appl. No.: 14/906,385

(22) PCT Filed: Aug. 4, 2014

(86) PCT No.: PCT/JP2014/070529
§ 371 (c)(1),
(2) Date: Jan. 20, 2016

(87) PCT Pub. No.: WO2015/020016
PCT Pub. Date: Feb. 12, 2015

(65) Prior Publication Data
US 2016/0168329 A1    Jun. 16, 2016

(30) Foreign Application Priority Data

Aug. 6, 2013 (JP) ................. 2013-163314
Aug. 6, 2013 (JP) ................. 2013-163317

(51) Int. Cl.
*C08G 73/10* (2006.01)
*C08J 5/04* (2006.01)
(Continued)

(52) U.S. Cl.
CPC ......... *C08G 73/1042* (2013.01); *C08G 73/10* (2013.01); *C08G 73/106* (2013.01);
(Continued)

(58) Field of Classification Search
CPC ................................ C08G 73/1042
See application file for complete search history.

(56) References Cited

U.S. PATENT DOCUMENTS 5,202,411 A  * 4/1993  Itatani ............ C08G 73/1007
                                                 428/473.5

FOREIGN PATENT DOCUMENTS

JP    62-236858 A    10/1987
JP     1-132632 A     5/1989
(Continued)

OTHER PUBLICATIONS

English machine translation of Hosokawa et al. (JP 2002-179913); translated Mar. 2, 2017.*

(Continued)

*Primary Examiner* — Michael F Pepitone
(74) *Attorney, Agent, or Firm* — Oblon, McClelland, Maier & Neustadt, L.L.P.

(57) ABSTRACT

A polyimide resin containing a repeating structural unit of the following formula (1), a repeating structural unit of the following formula (2), and a repeating structural unit of the following formula (A) or a repeating structural unit of the following formula (B), a content ratio of formula (1) with respect to the total of formula (1) and formula (2) being from 40 to 70 mol %, and a content ratio of formula (A) or formula (B) with respect to the total of formula (1) and formula (2) being more than 0 mol % and 25 mol % or less:

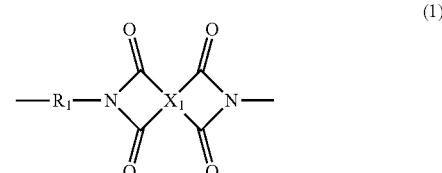

(1)

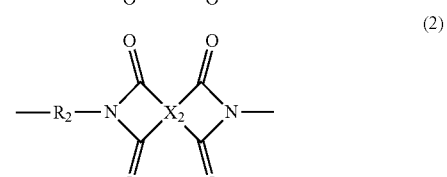

(2)

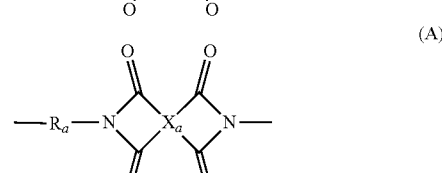

(A)

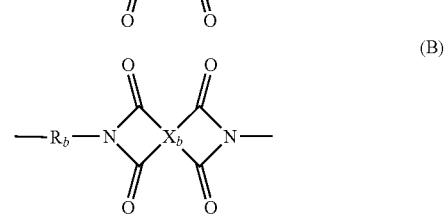

(B)

wherein $R_1$ represents a divalent group having from 6 to 22 carbon atoms containing at least one alicyclic hydrocarbon structure; $R_2$ represents a divalent chain aliphatic group having from 5 to 20 carbon atoms; $R_a$ represents a divalent group containing at least one aromatic ring which is bonded to a monovalent or divalent electron-attracting group; $R_b$ represents a divalent group containing —$SO_2$— or —$Si(R_x)(R_y)O$— wherein $R_x$ and $R_y$ each independently represent a chain aliphatic group having from 1 to 3 carbon atoms, or a phenyl group; and $X_1$, $X_2$, $X_a$, and $X_b$ each independently represent a tetravalent group having from 6 to 22 carbon atoms containing at least one aromatic ring.

9 Claims, No Drawings

(51) Int. Cl.
  *C08J 5/18* (2006.01)
  *C09J 179/08* (2006.01)
  *D01F 6/74* (2006.01)

(52) U.S. Cl.
  CPC ..... *C08G 73/1039* (2013.01); *C08G 73/1064* (2013.01); *C08J 5/04* (2013.01); *C08J 5/18* (2013.01); *C09J 179/08* (2013.01); *D01F 6/74* (2013.01); *C08G 73/1028* (2013.01); *C08G 73/1082* (2013.01); *C08J 2379/08* (2013.01)

(56) References Cited

FOREIGN PATENT DOCUMENTS

| | | | |
|---|---|---|---|
| JP | 2002-179913 A | | 6/2002 |
| JP | 2002179913 A | * | 6/2002 |
| JP | 2005-28524 A | | 2/2005 |
| JP | 2012-184317 A | | 9/2012 |
| JP | 2013-79345 A | | 5/2013 |

OTHER PUBLICATIONS

"AURUM Technical Information/G-06 AURUM injection molding conditions," Internet <URL:http://ip.mitsuichem.com/info/aurum/aurum#pdf/G#06.pdf>, Jan. 15, 2004, (1 page).

Vladimir E. Yudin, et al., "The Nucleating Effect of Carbon Nanotubes on Crystallinity in R-BAPB-Type Thermoplastic Polyimide," Macromolecular Rapid Communications, vol. 26, 2005, pp. 885-888.

International Search Report dated Aug. 26, 2014 in PCT/JP2014/070529 filed Aug. 4, 2014.

* cited by examiner

POLYIMIDE RESIN

CROSS-REFERENCE TO RELATED APPLICATIONS

The present application is a National Stage of PCT/JP2014/070529, which was filed on Aug. 4, 2014. This application is based upon and claims the benefit of priority to Japanese Application No. 2013-163317, which was filed on Aug. 6, 2017, and to Japanese Application No. 2013-163314, which was filed on Aug. 6, 2017.

TECHNICAL FIELD

The present invention relates to a polyimide resin.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like.

Meanwhile, a growing demand for highly heat-resistant low colored resins has been growing in recent years. This is because there has been such a growing demand that glass for use in display materials or the like is replaced with a resin, thereby improving weight saving and impact resistance, or a highly white resin is used in a reflector for automobiles, thereby maintaining weight saving and high luminance. Improvement in productivity is also an important factor for these use applications. Thus, a resin having thermoplasticity is also sufficiently highly advantageous.

However, only rare resins possess both high heat resistance and moldability (thermoplasticity) and additionally have low colorability or flame resistance. A large number of studies have therefore been made on, for example, low coloring or imparting of thermoplasticity by use of a polyimide resin, which is originally highly heat-resistant.

For example, Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

A polyimide resin generally has no melting point below the decomposition temperature because of its rigid structure. Aurum (registered trademark) has been put on the market as a crystalline thermoplastic polyimide resin that may be injection-molded or extrusion-molded (see PTL 2 and NPL 1). The material is a rigid wholly aromatic polyimide resin but succeeds to have a melting point, which is generally difficult to be observed, at a temperature lower than the decomposition temperature by introducing plural flexible ether bonds and meta structures into the structure. Also, in light of its glass transition temperature as very high as 250° C., it can be said that the resin is excellent in heat resistance.

Furthermore, a method using a long linear aliphatic diamine as a raw material diamine is one of the methods for improving the molding processability of the polyimide resin, i.e., the methods for decreasing the melting point of the polyimide resin (NPL 2). This reduces the rigidity of the polyimide, and thus also decreases the melting point. This method, however, might decrease the glass transition temperature along with the decrease of the melting point, and in particular, might reduce the strength at a high temperature. Another problem of this method is difficult synthesis of a polyimide resin using a raw material diamine composed mainly of an aliphatic diamine.

CITATION LIST

Patent Literature

PTL 1: JP-A-2005-28524
PTL 2: JP-A-62-236858

Non Patent Literature

NPL 1: "AURUM Technical Information/G-06 AURUM injection molding conditions", [online], Jan. 15, 2004 [searched on Jun. 28, 2013], Internet <URL: http://jp.mit-suichem.com/info/aurum/aurum#pdf/G#06.pdf>
NPL 2: Macromol. Rapid. Commun., 885, 26, 2005

SUMMARY OF INVENTION

Technical Problem

However, in PTL 2, an aromatic raw material is used in both of a tetracarboxylic acid component and a diamine component. Hence, the color is brown, which is peculiar to a polyimide, and it is very difficult to suppress coloring. Since the strong coloring of a polyimide resin is attributed to intramolecular or intermolecular charge transfer, the introduction of a structure for cleaving this may suppress the coloring.

Also, Aurum is a wholly aromatic polyimide, and thus exhibits high flame resistance at a V-0 level in the UL94 standards. However, Aurum is limited by an available apparatus because this resin has a high melting point and requires a molding temperature of generally 400° C. or more.

An object of the present invention is to provide a polyimide resin that is capable of being easily processed by molding and prepared into a molded article excellent in heat resistance. Another object of the present invention is to provide a polyimide resin that is capable of being prepared into a molded article excellent in low colorability or flame resistance in addition to this property.

Solution to Problem

The present inventors have found that the aforementioned objects can be attained by a polyimide resin containing particular repeating units at a particular ratio.

Accordingly, the present invention provides a polyimide resin containing a repeating structural unit represented by the following formula (1), a repeating structural unit represented by the following formula (2), and a repeating structural unit represented by the following formula (A) or a repeating structural unit represented by the following formula (B), a content ratio of the repeating structural unit of formula (1) with respect to the total of the repeating structural unit of formula (1) and the repeating structural unit of formula (2) being from 40 to 70 mol %, and a content ratio of the repeating structural unit of formula (A) or the repeating structural unit of formula (B) with respect to the total of the repeating structural unit of formula (1) and the repeating structural unit of formula (2) being more than 0 mol % and 25 mol % or less:

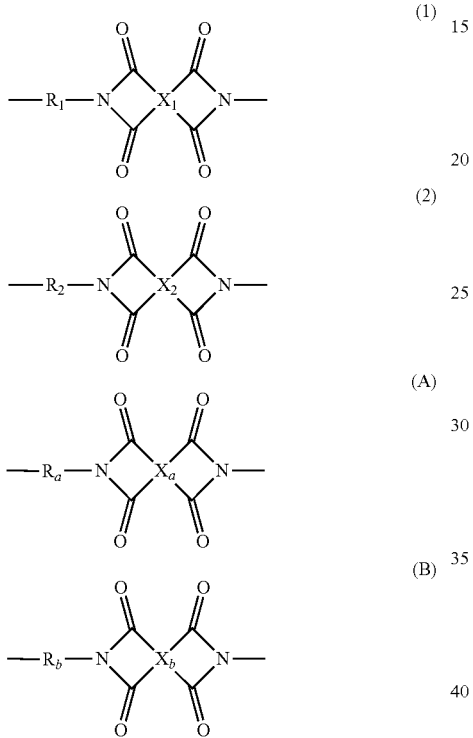

wherein $R_1$ represents a divalent group having from 6 to 22 carbon atoms containing at least one alicyclic hydrocarbon structure; $R_2$ represents a divalent chain aliphatic group having from 5 to 20 carbon atoms; $R_a$ represents a divalent group containing at least one aromatic ring which is bonded to a monovalent or divalent electron-attracting group; $R_b$ represents a divalent group containing —$SO_2$— or —$Si(R_x)(R_y)O$— wherein $R_x$ and $R_y$ each independently represent a chain aliphatic group having from 1 to 3 carbon atoms, or a phenyl group; and $X_1$, $X_2$, $X_a$, and $X_b$ each independently represent a tetravalent group having from 6 to 22 carbon atoms containing at least one aromatic ring.

Advantageous Effects of Invention

According to the present invention, a polyimide resin that is capable of being easily processed by molding and prepared into a molded article excellent in heat resistance may be provided. Also, a polyimide resin that is capable of being prepared into a molded article excellent in low colorability or flame resistance in addition to this property may be provided.

DESCRIPTION OF EMBODIMENTS

[Polyimide Resin]

The polyimide resin of the present invention contains a repeating structural unit represented by the following formula (1), a repeating structural unit represented by the following formula (2), and a repeating structural unit represented by the following formula (A) or a repeating structural unit represented by the following formula (B), the content ratio of the repeating structural unit of formula (1) with respect to the total of the repeating structural unit of formula (1) and the repeating structural unit of formula (2) is from 40 to 70 mol %, and the content ratio of the repeating structural unit of formula (A) or the repeating structural unit of formula (B) with respect to the total of the repeating structural unit of formula (1) and the repeating structural unit of formula (2) is more than 0 mol % and 25 mol % or less:

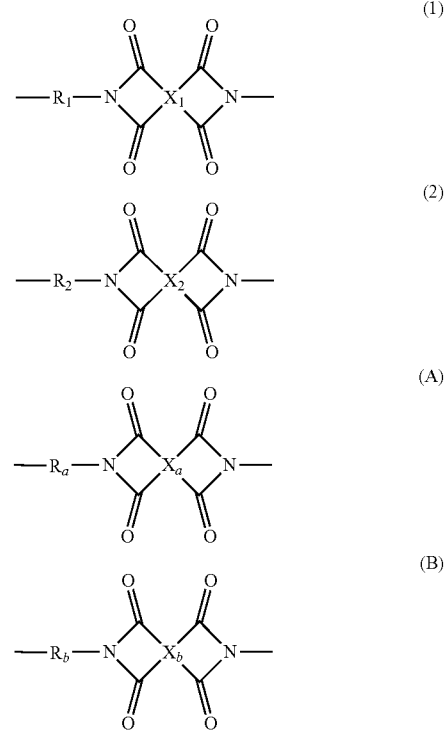

wherein $R_1$ represents a divalent group having from 6 to 22 carbon atoms containing at least one alicyclic hydrocarbon structure; $R_2$ represents a divalent chain aliphatic group having from 5 to 20 carbon atoms; $R_a$ represents a divalent group containing at least one aromatic ring which is bonded to a monovalent or divalent electron-attracting group; $R_b$ represents a divalent group containing —$SO_2$— or —$Si(R_x)(R_y)O$— wherein $R_x$ and $R_y$ each independently represent a chain aliphatic group having from 1 to 3 carbon atoms, or a phenyl group; and $X_1$, $X_2$, $X_a$ and $X_b$ each independently represent a tetravalent group having from 6 to 22 carbon atoms containing at least one aromatic ring.

The polyimide resin of the present invention contains a repeating structural unit represented by the formula (1) and a repeating structural unit represented by the formula (2), and the content ratio of the repeating structural unit of formula (1) with respect to the total of the repeating structural unit of formula (1) and the repeating structural unit of formula (2) is from 40 to 70 mol %. The polyimide resin contains such particular plural kinds of polyimide structural units combined at a particular ratio, and thus has a peculiar capability, a low melting point of 360° C. or less and, for example, a high glass transition temperature of 170° C. or more (preferably 200° C. or more). The polyimide resin has a large crystallization rate with a crystallization half-time of 60 seconds or less. Thus, a resin that possesses both molding processability and high heat resistance is obtained, unlike use of general polyimide lacking thermoplasticity or thermoplastic resins having a low glass transition temperature.

The polyimide resin of the present invention is excellent in molding processability, and thus also has the advantage that various additives may be added thereto during its heat melting.

When the polyimide resin contains the repeating structural unit represented by the formula (A), the content ratio of the repeating structural unit of formula (A) with respect to the total of the repeating structural unit of formula (1) and the repeating structural unit of formula (2) is more than 0 mol % and 25 mol % or less. The repeating structural unit of formula (A) contained in the predetermined amount allows a molded article to exert excellent low colorability.

The "low colorability" described herein means that a polyimide powder having a particle size of from 25 μm to 90 μm has a yellow index (YI value) of 60 or less (preferably 50 or less) before being subjected to thermal history by heat melting and molding.

When the polyimide resin contains the repeating structural unit represented by the formula (B), the content ratio of the repeating structural unit of formula (B) with respect to the total of the repeating structural unit of formula (1) and the repeating structural unit of formula (2) is more than 0 mol % and 25 mol % or less. The repeating structural unit of formula (B) contained in the predetermined amount may improve the flame resistance of a molded article.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

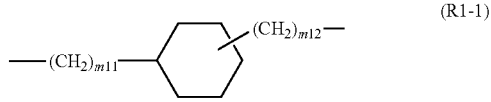
(R1-1)

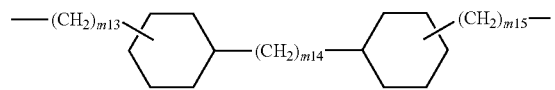
(R1-2)

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

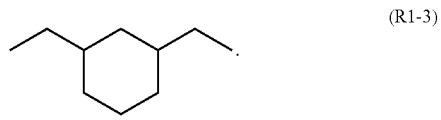
(R1-3)

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

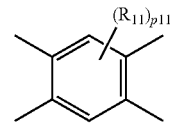
(X-1)

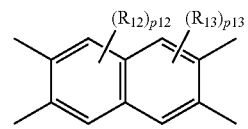
(X-2)

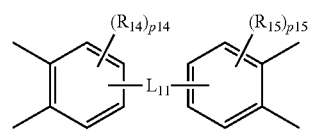
(X-3)

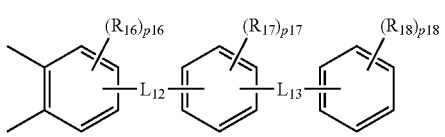
(X-4)

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 6 to 22 carbon atoms.

Similarly, $L_{11}$, $R_{14}$, $R_{15}$, $p_{14}$ and $p_{15}$ in the formula (X-3) are selected in such a manner that the tetravalent group represented by the formula (X-3) has from 6 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 6 to 22 carbon atoms.

$X_1$ is particularly preferably a tetravalent group represented by the following formula (X-5) or (X-6):

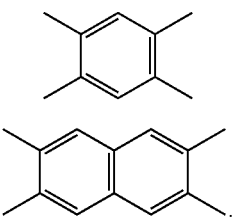

(X-5)

(X-6)

Next, the repeating structural unit of formula (2) will be described in detail below.

$R_2$ represents a divalent chain aliphatic group having from 5 to 20 carbon atoms (preferably from 5 to 16 carbon atoms, and more preferably from 5 to 12 carbon atoms). The chain aliphatic group herein means a group derived from a chain aliphatic compound, and the chain aliphatic compound may be either saturated or unsaturated, may be in the form of either a straight chain or a branched chain, and may contain a hetero atom, such as an oxygen atom.

$R_2$ is preferably an alkylene group having from 5 to 20 carbon atoms, more preferably an alkylene group having from 5 to 16 carbon atoms, further preferably an alkylene group having from 5 to 12 carbon atoms, and particularly preferably an alkylene group having from 6 to 10 carbon atoms. The alkylene group may be either a straight-chain alkylene group or a branched alkylene group, and is preferably a straight-chain alkylene group.

$R_2$ is particularly preferably a hexamethylene group.

Another preferred embodiment of $R_2$ is a divalent chain aliphatic group having from 5 to 20 carbon atoms (preferably from 5 to 16 carbon atoms, and more preferably from 5 to 12 carbon atoms) containing an ether group. Preferred examples of the group include a divalent group represented by the following formula (R2-1) or (R2-2):

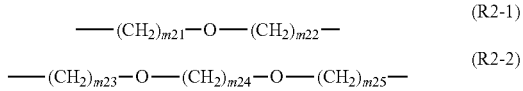

(R2-1)

(R2-2)

wherein $m_{21}$ and $m_{22}$ each independently represent an integer of 1-19, preferably 1-15, more preferably 1-11, and further preferably 2-6; and $m_{23}$ to $m_{25}$ each independently represent an integer of 1-18, preferably 1-14, more preferably 1-10, and further preferably 2-4.

$R_2$ is a divalent chain aliphatic group having from 5 to 20 carbon atoms (preferably from 5 to 16, and more preferably from 5 to 12 carbon atoms), and therefore $m_{21}$ and $m_{22}$ in the formula (R2-1) are selected in such a manner that the divalent group represented by the formula (R2-1) has from 5 to 20 carbon atoms, i.e., $m_{21}+m_{22}$ is from 5 to 20, preferably from 5 to 16 carbon atoms, and more preferably from 5 to 12 carbon atoms.

Similarly, $m_{23}$ to $m_{25}$ in the formula (R2-2) are selected in such a manner that the divalent group represented by the formula (R2-2) has from 5 to 20 carbon atoms, i.e., $m_{23}+m_{24}+m_{25}$ is from 5 to 20, preferably from 5 to 16 carbon atoms, and more preferably from 5 to 12 carbon atoms.

$X_2$ is defined similarly to $X_1$ in the formula (1), and preferred embodiments thereof are also the same.

The content ratio of the repeating structural unit of formula (1) with respect to the total of the repeating structural unit of formula (1) and the repeating structural unit of formula (2) is from 40 to 70 mol %. In the case where the content ratio of the repeating structural unit of formula (1) is in the above-described range, the polyimide resin has a large crystallization rate with a crystallization half-time of 60 seconds or less, and thus the polyimide resin of the present invention may be sufficiently crystallized in an ordinary injection molding cycle. The content ratio of the repeating structural unit of formula (1) with respect to the total of the repeating structural unit of formula (1) and the repeating structural unit of formula (2) is preferably from 40 to 60 mol %.

The repeating structural unit of formula (A) will be described in detail below.

$R_a$ represents a divalent group containing at least one aromatic ring which is bonded to a monovalent or divalent electron-attracting group. The presence of $R_a$ produces the effect of low colorability.

Examples of the aromatic ring in $R_a$ include a benzene ring, a naphthalene ring, and an anthracene ring. A benzene ring is preferred. The number of the aromatic ring is preferably on the order of from 1 to 4.

Also, examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups, such as alkylene fluoride groups (e.g., —C(CF$_3$)$_2$— and —(CF$_2$)$_p$— wherein p is an integer of 1-10), as well as —CO—, —SO$_2$—, —SO—, —CONH—, and —COO—.

Among these, halogen, an alkyl halide group, or an alkylene halide group is preferred. When the electron-attracting group is halogen, an alkyl halide group, or an alkylene halide group, not only low colorability but also flame resistance may be imparted. The use application of a molded article may therefore be expanded.

Fluorine, an alkyl fluoride group, or an alkylene fluoride group is more preferred for exerting lower colorability.

The preferred structure of $R_a$ is a group containing any of the following groups:

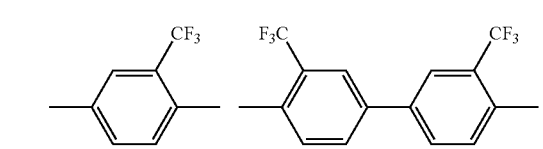

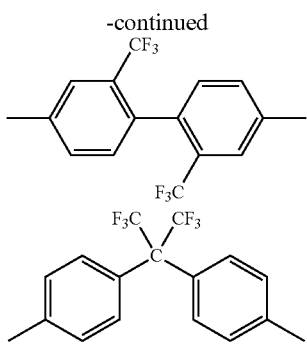

$X_a$ is defined similarly to $X_1$ in the formula (1), and preferred embodiments thereof are also the same.

The content ratio of the repeating structural unit of formula (A) with respect to the total of the repeating structural unit of formula (1) and the repeating structural unit of formula (2) is more than 0 mol % and 25 mol % or less. When the repeating structural unit of formula (A) falls within the aforementioned range, sufficient low colorability may be exerted while heat resistance or flame resistance may be improved by the introduction of an aromatic diamine. The content ratio of the repeating structural unit of formula (A) with respect to the total of the repeating structural unit of formula (1) and the repeating structural unit of formula (2) is preferably more than 0 mol % and 15 mol % or less, and more preferably from 2 to 10 mol %.

The content ratio of the total of the repeating structural unit of formula (1), the repeating structural unit of formula (2), and the repeating structural unit of formula (A) with respect to the total repeating units constituting the polyimide resin is preferably from 50 to 100 mol %, more preferably from 75 to 100 mol %, further preferably from 80 to 100 mol %, and still further preferably from 85 to 100 mol %.

The repeating structural unit of formula (B) will be described in detail below.

$R_b$ represents a divalent group containing —SO$_2$— or —Si(R$_x$)(R$_y$)O—, and R$_x$ and R$_y$ each independently represent a chain aliphatic group having from 1 to 3 carbon atoms, or a phenyl group. The presence of $R_b$ produces the effect of flame resistance.

Examples of the specific substituents of R$_x$ and R$_y$ include a methyl group, an ethyl group, an isopropyl group, a propyl group, and a phenyl group.

When $R_b$ represents a divalent group containing —SO$_2$—, the formula (B) is preferably a repeating structural unit represented by the following formula (B-1):

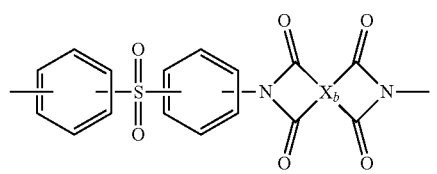

(B-1)

When $R_b$ represents a divalent group containing —Si(R$_x$)(R$_y$)O—, the formula (B) is preferably a repeating structural unit represented by the following formula (B-2):

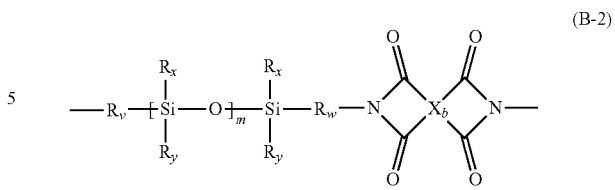

(B-2)

In the formula, Rv and Rw each independently represent a divalent hydrocarbon group having 6 or less carbon atoms. Examples thereof include an alkylene group and a phenylene group. m represents an integer of 1-5.

$X_b$ is defined similarly to $X_1$ in the formula (1), and preferred embodiments thereof are also the same.

The content ratio of the repeating structural unit of formula (B) with respect to the total of the repeating structural unit of formula (1) and the repeating structural unit of formula (2) is more than 0 mol % and 25 mol % or less. When the repeating structural unit of formula (B) falls within the aforementioned range, flame resistance may be improved. The content ratio of the repeating structural unit of formula (B) with respect to the total of the repeating structural unit of formula (1) and the repeating structural unit of formula (2) is preferably from 5 to 25 mol %, and more preferably from 5 to 20 mol %.

The content ratio of the total of the repeating structural unit of formula (1), the repeating structural unit of formula (2) and the repeating structural unit of formula (B) with respect to the total repeating units constituting the polyimide resin is preferably from 50 to 100 mol %, more preferably from 75 to 100 mol %, further preferably from 80 to 100 mol %, and still further preferably from 85 to 100 mol %.

The polyimide resin of the present invention may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

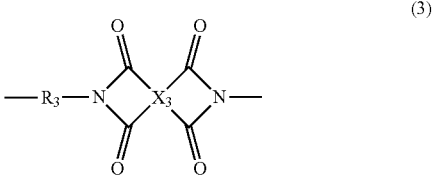

(3)

wherein R$_3$ represents a divalent group having from 6 to 22 carbon atoms containing at least one aromatic ring; and X$_3$ represents a tetravalent group having from 6 to 22 carbon atoms containing at least one aromatic ring, provided that when R$_3$ contains at least one aromatic ring, the aromatic ring is not bonded to an electron-attracting group.

R$_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

$R_3$ is preferably a divalent group represented by the following formula (R3-1) or (R3-2):

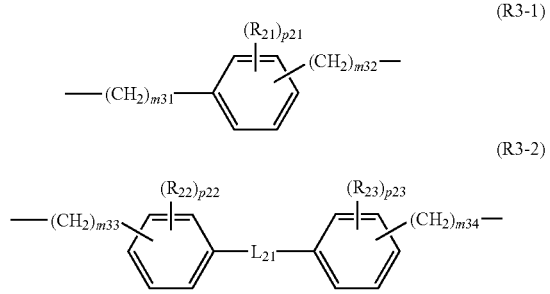

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

When the polyimide resin of the present invention contains the repeating structural unit of formula (3), the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 7 mol % or more, in consideration of enhancement of the heat resistance, and is preferably 20 mol % or less, and more preferably 15 mol % or less, in consideration of maintenance of the crystallinity.

The polyimide resin of the present invention may have, for example, a melting point of 360° C. or less and a glass transition temperature of 170° C. or more (preferably 200° C. or more).

The polyimide resin of the present invention preferably has an exothermic amount of the crystallization exothermic peak of 5 mJ/mg or more, the crystallization exothermic peak being observed when the resin is melted and then cooled at a cooling rate of 10° C./min or more in a differential scanning calorimeter.

The polyimide resin of the present invention may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure, a chain aliphatic diamine, and a diamine containing the divalent group containing at least one aromatic ring which is bonded to a monovalent or divalent electron-attracting group already mentioned above.

The tetracarboxylic acid containing at least one aromatic ring is preferably a compound having four carboxyl groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3', 4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either a straight chain or a branched chain, and preferably has from 5 to 20 carbon atoms (preferably from 5 to 16 carbon atoms, and more preferably from 5 to 12 carbon atoms). The linear moiety having from 5 to 20 carbon atoms may contain an ether bond in the course thereof. Preferred examples of the chain aliphatic diamine include 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,13-tridecamethylenediamine, 1,14-tetradecamethylenediamine, 1,16-hexadecamethylenediamine, 1,11-undecamethylenediamine, 1,12-dodecamethylenediamine and 2,2'-(ethylenedioxy)bis(ethyleneamine).

The chain aliphatic diamine may be used as a sole compound or as a mixture of plural kinds thereof within the range of the present invention. Among these, a chain aliphatic diamine having from 6 to 10 carbon atoms is preferably used, and 1,6-hexamethylenediamine is particularly preferably used.

Examples of the diamine containing the divalent group containing at least one aromatic ring which is bonded to a monovalent or divalent electron-attracting group include 2,2-di(3-aminophenyl)-1,1,1,3,3,3-hexafluoropropane, 2,2-di(4-aminophenyl)-1,1,1,3,3,3-hexafluoropropane, 2-(3-aminophenyl)-2-(4-aminophenyl)-1,1,1,3,3,3-hexafluoropropane, 1,4-bis(3-amino-α,α-ditrifluoromethylbenzyl)benzene, 2,2-bis[3-(3-aminophenoxy)phenyl]-1,1,1,3,3,3-hexafluoropropane, 2,2-bis[4-(4-aminophenoxy)phenyl]hexafluoropropane, and 2,2'-bis(trifluoromethyl)benzidine.

Examples of the diamine containing the divalent group containing —$SO_2$—include diaminodiphenylsulfone.

Examples of the diamine containing the divalent group containing —$Si(R_x)(R_y)O$— already mentioned above include ω,ω'-bis-aminomethyl polydimethylsiloxane, ω,ω'-bis(2-aminoethyl)polydimethylsiloxane, ω,ω'-bis(3-aminopropyl)polydimethylsiloxane, ω,ω'-bis(4-aminophenyl)polydimethylsiloxane, ω,ω'-bis(3-aminopropyl)polydiphenylsiloxane, and ω,ω'-bis(3-aminopropyl)polymethylphenylsiloxane.

In the production of the polyimide resin of the present invention, the molar ratio of the charged amount of the diamine containing at least one alicyclic hydrocarbon structure with respect to the total amount of the diamine containing at least one alicyclic hydrocarbon structure and the chain aliphatic diamine is preferably from 40 to 70 mol %. The molar ratio of the charged amount of the diamine containing the divalent group containing —$SO_2$— or —$Si(R_x)(R_y)O$— already mentioned above with respect to the total amount of the diamine containing at least one alicyclic hydrocarbon structure and the chain aliphatic diamine is preferably more than 0 mol % and 25 mol % or less.

In the production of the polyimide resin of the present invention, the molar ratio of the charged amount of the diamine containing at least one alicyclic hydrocarbon structure with respect to the total amount of the diamine containing at least one alicyclic hydrocarbon structure and the chain aliphatic diamine is preferably from 40 to 70 mol %. The molar ratio of the charged amount of the diamine containing the divalent group containing at least one aromatic ring which is bonded to a monovalent or divalent electron-attracting group already mentioned above with respect to the total amount of the diamine containing at least one alicyclic hydrocarbon structure and the chain aliphatic diamine is preferably more than 0 mol % and 25 mol % or less.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less. The lower limit thereof is not particularly limited but needs to exceed 0 mol %. The molar ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

In the production of the polyimide resin, the charged amount ratio of the tetracarboxylic acid component and the diamine component is preferably from 0.9 to 1.1 mol of the diamine component per 1 mol of the tetracarboxylic acid component.

In the production of the polyimide resin, an end capping agent may be mixed in addition to the tetracarboxylic acid component and the diamine component. The end capping agent is preferably one or more selected from a monoamine compound and a dicarboxylic acid compound. The charged amount of the end capping agent to be introduced is preferably from 0.0001 to 0.1 mol, and more preferably from 0.001 to 0.06 mol, per 1 mol of the aromatic tetracarboxylic acid and/or the derivative thereof.

Examples of the monoamine end capping agent include methylamine, ethylamine, propylamine, butylamine, benzylamine, 4-methylbenzylamine, 4-ethylbenzylamine, 4-dodecylbenzylamine, 3-methylbenzylamine, 3-ethylbenzylamine, aniline, 3-methylaniline and 4-methylaniline. Among these, benzylamine and aniline are preferred.

The dicarblxylic acid end capping agent is preferably a dicarboxylic acid compound, which may partially have a closed ring structure. Examples thereof include phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid and 4-cyclohexene-1,2-dicarboxylic acid. Among these, phthalic acid and phthalic anhydride are preferred.

As a polymerization method for producing the polyimide resin, a known polymerization method for producing a polyimide may be applied, and examples thereof include, for example, solution polymerization, melt polymerization, solid phase polymerization, suspension polymerization and the like while not particularly limited. Among these, suspension polymerization under a high temperature condition using an organic solvent is preferred. On performing suspension polymerization under a high temperature condition, the polymerization is preferably performed at 150° C. or more, and more preferably at from 180 to 250° C. The polymerization time may vary depending on the monomers used, and is preferably approximately from 0.5 to 6 hours.

The method for producing the polyimide resin preferably includes the step of reacting the tetracarboxylic acid component with the diamine component in the presence of a solvent containing an alkylene glycol-based solvent represented by the following formula (I). In this way, the polyimide resin may be obtained in a powder form.

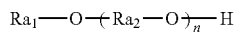

(I)

wherein $Ra_1$ represents a hydrogen atom or an alkyl group having from 1 to 4 carbon atoms; $Ra_2$ represents a linear alkylene group having from 2 to 6 carbon atoms; and n represents an integer of 1-3.

The alkylene glycol-based solvent has a boiling point of preferably 140° C. or more, more preferably 160° C. or more, and further preferably 180° C. or more, in consideration of feasible polymerization reaction under high temperature conditions at normal pressure.

In the formula (I), $Ra_1$ represents a hydrogen atom or an alkyl group having from 1 to 4 carbon atoms and is preferably an alkyl group having from 1 to 4 carbon atoms, and more preferably a methyl group or an ethyl group.

In the formula (I), $Ra_2$ represents a linear alkylene group having from 2 to 6 carbon atoms and is preferably a linear alkylene group having 2 or 3 carbon atoms, and more preferably an ethylene group.

In the formula (I), n represents an integer of 1-3 and is preferably 2 or 3.

Specific examples of the alkylene glycol-based solvent include ethylene glycol monomethyl ether, diethylene glycol monomethyl ether (also known as 2-(2-methoxyethoxy)ethanol), triethylene glycol monomethyl ether, ethylene glycol monoethyl ether, diethylene glycol monoethyl ether (also known as 2-(2-ethoxyethoxy)ethanol), ethylene glycol monoisopropyl ether, diethylene glycol monoisopropyl ether, triethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, ethylene glycol monoisobutyl ether, ethylene glycol, and 1,3-propanediol. These solvents may each be used alone, or two or more solvents selected from them may be used in combination. Among these solvents, 2-(2-methoxyethoxy)ethanol, triethylene glycol monomethyl ether, 2-(2-ethoxyethoxy)ethanol, and 1,3-propanediol are preferred, and 2-(2-methoxyethoxy)ethanol and 2-(2-ethoxyethoxy)ethanol are more preferred.

The content of the alkylene glycol-based solvent in the solvent is preferably 30 mass % or more, more preferably 50 mass % or more, and further preferably 75 mass % or more. The solvent may consist of the alkylene glycol-based solvent alone.

When the solvent contains the alkylene glycol-based solvent and an additional solvent, specific examples of the "additional solvent" include water, benzene, toluene, xylene, acetone, hexane, heptane, chlorobenzene, methanol, ethanol, n-propanol, isopropanol, N-methyl-2-pyrrolidone, N,N-dimethylacetamide, N, N-diethylacetamide, N,N-dimethylformamide, N,N-diethylformamide, N-methylcaprolactam, hexamethylphosphoramide, tetramethylene sulfone, dimethylsulfoxide, o-cresol, m-cresol, p-cresol, phenol, p-chlorophenol, 2-chloro-4-hydroxytoluene, diglyme, triglyme, tetraglyme, dioxane, γ-butyrolactone, dioxolane, cyclohexanone, cyclopentanone, dichloromethane, chloroform, 1,2-dichloroethane, 1,1,2-trichloroethane, dibromomethane, tribromomethane, 1,2-dibromoethane, and 1,1,2-tribromoethane. These solvents may each be used alone, or two or more solvents selected from them may be used in combination.

Preferred examples of the method for producing the polyimide resin include a method which involves separately preparing (a) a solution containing the tetracarboxylic acid component in the solvent containing the alkylene glycol-based solvent and (b) a solution containing the diamine component in the solvent containing the alkylene glycol-based solvent, then adding the solution (b) to the solution (a) or adding the solution (a) to the solution (b), thereby preparing (c) a solution containing a polyamic acid, and subsequently imidizing the polyamic acid by the heating of the solution (c), thereby synthesizing a polyimide resin.

The reaction of the tetracarboxylic acid component with the diamine component is preferably performed under normal pressure.

In the method for producing the polyimide resin, preferably, the tetracarboxylic acid component contains a tetracarboxylic dianhydride; the step of reacting the tetracarboxylic acid component with the diamine component includes: step (i) of adding (b) a solution containing the diamine component and the alkylene glycol-based solvent to (a) a solution containing the tetracarboxylic acid component and the alkylene glycol-based solvent, thereby preparing (c) a solution containing a polyamic acid; and step (ii) imidizing the polyamic acid by the heating of the solution (c), thereby providing a polyimide resin; and in the step (i), the solution (b) is added to the solution (a) such that the amount of the diamine component added per unit time with respect to 1 mol of the tetracarboxylic acid component is 0.1 mol/min or less, in consideration of reduction in the amount of by-products in the polyimide resin.

The polyimide resin of the present invention contains the repeating structural unit of formula (A) and thereby has excellent low colorability. The polyimide resin of the present invention has, for example, YI of preferably 60 or less in a powder state before being subjected to the heat melting step. When YI is 60 or less, a molded article is free from brown color, which is the color of general polyimides, and may have pale yellow color or be colorless. Thus, this molded article has such an advantage that it may be used in use application that requires low colorability or is easily colored with various kinds of additives. Specifically, YI may be measured by the method described in Examples.

<Other Components>

The polyimide resin of the present invention may be mixed with other resins according to purposes and used. Examples of the resins include polyetheretherketone, polyether imide, polysulfone, polyphenylenesulfide, polyamide, polyamideimide, polyphenyleneether, polyacrylate, polyester, polycarbonate, liquid crystal polymers, and polyimides other than the polyimide resin of the present invention.

The polyimide resin of the present invention may also be mixed, if necessary, with additives, such as a delusterant, an ultraviolet absorber, a filler, an antioxidant, a flame retardant, a slidability-improving agent, a nucleating agent, a plasticizer, an antistatic agent, an anti-coloring agent, and an anti-gelling agent, without impairing its characteristics, thereby preparing a polyimide resin composition.

[Molded Article]

The molded article of the present invention contains the polyimide resin of the present invention. Since the polyimide resin of the present invention is melted essentially at a temperature of 360° C. or less, a molded article may be produced by heat-molding the polyimide resin of the present invention. Examples of the heat molding method include injection molding, extrusion molding, blow molding, heat press molding, vacuum molding, pneumatic molding, laser molding, welding and heat adhesion, and the polyimide resin of the present invention may be molded by any molding method that includes a heat melting step. The heat melting and molding are preferably performed in an inert gas atmosphere or a deaerated atmosphere in order to suppress deterioration in hue caused by oxidative degradation.

The method for producing a molded article according to the present invention preferably includes the step of heat-molding the polyimide resin of the present invention at from 300 to 400° C. Examples of specific procedures include the following method.

First, the polyimide resin of the present invention is introduced in an extruder, and melt-kneaded and extrusion-molded preferably at from 300 to 400° C., thereby preparing pellets consisting of the polyimide resin of the present invention.

The pellets may be dried, then introduced in various kinds of molding machines, and heat-molded preferably at from 300 to 400° C., thereby producing a molded article having a desired shape.

Since the polyimide resin of the present invention may be heat-molded by extrusion molding or the like at a relatively low temperature of from 300 to 400° C., the polyimide resin of the present invention is excellent in molding processability and may be easily produced into a molded product having a desired shape. The temperature of the heat molding is preferably from 320 to 380° C.

The bending strength of the molded article of the present invention when molded into a plate-like shape of 80 mm×10 mm×4 mm thick may be in the range of preferably from 50 to 170 MPa, and more preferably from 70 to 160 MPa. In this case, its flexural modulus may be in the range of preferably from 2.4 to 3.5 GPa, and more preferably from 2.6 to 3.2 GPa.

The tensile strength of the molded article of the present invention when molded into a JIS K7139 type A test specimen may be in the range of preferably from 50 to 160 MPa, and more preferably from 60 to 140 MPa. In this case, its tensile modulus may be in the range of preferably from 2.4 to 3.5 GPa, and more preferably from 2.6 to 3.2 GPa.

The bending strength and the flexural modulus may be measured according to JIS K7171, and the tensile strength and the tensile modulus may be measured according to JIS K7113.

The molded article of the present invention is excellent in flame resistance by virtue of the polyimide resin according to the present invention containing the repeating structural unit of formula (B). The degree of flame resistance may be confirmed by simply measuring an oxygen index as an index for flame resistance. The oxygen index refers to an oxygen concentration required to continue combustion. When the oxygen index exceeds 21, combustion is not continued in the air under general conditions. An oxygen index of 23 or more indicates favorable flame resistance. In general, an oxygen index of 26 or more indicates higher flame resistance.

When the oxygen index of the polyimide resin of the present invention is measured, the oxygen index is preferably 23 or more, and more preferably 26 or more. Specifically, the oxygen index may be measured by the method described in Examples.

Examples of the shape of the molded article of the present invention include, but are not particularly limited to, a film, a sheet, a strand, pellets, fibers, a round bar, a rectangular bar, a sphere, a pipe, a tube, and a seamless belt. Particularly, a film, a fiber or the like is preferred. The resin of the present invention does not exhibit strong coloring as found in general polyimides. When the resin of the present invention is molded into a film, low colorability and transparency may be imparted. Thus, a film shape is more preferred.

The aforementioned molded article of the present invention is excellent in heat resistance and flame resistance and/or low colorability and is preferably used in, for example: electric or electronic members, such as lenses, optical connectors, optical pickups, coating materials for organic EL, surface mounting members, lamp sockets, transformers, heat dissipating spacers, power modules, and reflectors; automobile members, such as engine fittings, hoses, hydraulic lines, clutch lines, and brake lines; home electronics members; and bearings. Particularly, when the molded article is a film, this film is preferably used in flexible displays, optical circuit members, optical filters, interlayer dielectrics and the like, because low colorability and transparency may be imparted.

The polyimide resin of the present invention may be used as a heat-resistant adhesive by applying heat and pressure, and thus may be applied to a flexible board, a copper-clad laminated plate and the like.

[Composite Material]

The composite material of the present invention contains a fiber material (hereinafter, also referred to as "fiber material (B)") impregnated with the polyimide resin of the present invention (hereinafter, also referred to as "polyimide resin A") already mentioned above.

<Fiber Material (B)>

Examples of the fiber material (B) used in the present invention include: inorganic fibers, such as glass fiber, carbon fiber, alumina fiber, boron fiber, ceramic fiber, and metal fiber (steal fiber, etc.); and synthetic fibers, such as aramid fiber, polyoxymethylene fiber, aromatic polyamide fiber, poly-p-phenylene benzobisoxazole fiber, ultra-high molecular weight polyethylene fiber, and aromatic polyimide fiber. Among these, carbon fiber is preferably used because of having excellent features, i.e., high strength and a high modulus of elasticity in spite of its light weight. Polyacrylonitrile-based carbon fiber or pitch-based carbon fiber is preferably used as the carbon fiber.

The fiber material (B) may be in various forms, for example, monofilaments or multifilaments simply arranged in one direction or intercrossed, a fabric, such as a knit fabric, a non-woven fabric, or a mat. Among these, a monofilament, fabric, non-woven fabric, or mat form is preferred. Prepreg in which these are mounted or laminated and impregnated with a binder or the like is also preferably used.

The average fiber diameter of the fiber material (B) is preferably from 1 to 100 μm, more preferably from 3 to 50 μm, further preferably from 4 to 20 μm, and particularly preferably from 5 to 10 μm. When the average fiber diameter falls within this range, processing is easy and the resulting molded article is excellent in modulus of elasticity and strength. The average fiber diameter may be measured by observation under a scanning electron microscope (SEM) or the like. 50 or more fibers are selected at random, and their lengths are measured. A number-average fiber diameter may be calculated.

The fineness of the fiber material (B) is preferably from 20 to 3,000 tex, and more preferably from 50 to 2,000 tex. When the fineness falls within this range, processing is easy and the resulting molded article is excellent in modulus of elasticity and strength. The fineness may be determined in terms of weight per 1,000 m by determining the weights of long fibers having an arbitrary length. Carbon fiber generally having approximately from 500 to 30,000 filaments is preferably used.

The fiber length of the fiber material (B) present in the composite material of the present invention is preferably 1 cm or more, more preferably 1.5 cm or more, further preferably 2 cm or more, and particularly preferably 3 cm or more, in terms of average fiber length. The upper limit of the average fiber length differs depending on use application and is preferably 500 cm or less, more preferably 300 cm or less, and further preferably 100 cm or less.

The method for measuring the average fiber length in the composite material is not particularly limited, and the average fiber length may be determined, for example, by placing the composite material in hexafluoroisopropanol (HFIP) or concentrated sulfuric acid and measuring the lengths of fibers remaining after the dissolution of the polyimide resin. The lengths of the fibers may be measured by visual observation or in some cases, observation under an optical microscope, a scanning electron microscope (SEM) or the like. 100 fibers are selected at random, and their lengths are measured. A number-average fiber length may be calculated.

The average fiber length of a raw material before use of the fiber material used is not particularly limited and is preferably in the range of from 1 to 10,000 m, more preferably on the order of from 100 to 7,000 m, and further preferably on the order of from 1,000 to 5,000 m, in consideration of improvement in molding processability.

The fiber material (B) used in the present invention does not have to be used in the form of a chopped strand, which is as conventionally used in fiber-reinforced composite materials and is a fiber strand bundle cut into a certain length. In a more preferred embodiment of the present invention, the fiber material (B) having such a longer fiber is used. Unlike a chopped strand melt-kneaded and pelletized with a resin as conventionally frequently used, the long fiber material is used as it is, and overlaid with the polyimide resin (A) and impregnated therewith by applying heat and pressure, thereby providing a composite material. The fiber material (B) used in a long fiber state is capable of improving the modulus of elasticity and strength of the resulting molded article more than conventional molding materials using a cut fiber material, such as a chopped strand or a so-called continuous fiber. The fiber material used in a long fiber state is also capable of imparting anisotropy to the strength of the molded article, for example, improving the strength of the molded article in a particular direction. In addition, the step of producing a chopped strand may be omitted, and production cost may be reduced.

As a matter of course, however, the present invention is not intended to exclude use of the fiber material (B) in combination with a chopped fiber (D). In the case of using the fiber material (B) in combination with a chopped fiber (D), the average fiber diameter of the chopped fiber (D) is preferably shorter than that of the fiber material (B).

A fiber material having, on its surface, a functional group having affinity for or reactivity with the polyimide resin (A) is preferred for improving wettability and interface adherence with the polyimide resin (A).

Preferred examples of the fiber material having a functional group having affinity for or reactivity with the polyimide resin (A) include a fiber material surface-treated with a surface treatment agent or a sizing agent or the like.

Examples of the surface treatment agent include surface treatment agents consisting of functional compounds, such as epoxy compounds, acrylic compounds, isocyanate compounds, silane compounds, and titanate compounds. The surface treatment agent is, for example, a silane-based coupling agent or a titanate-based coupling agent, and is preferably a silane-based coupling agent.

Examples of the silane-based coupling agent include trialkoxy- or triallyloxy-silane compounds, such as aminopropyltriethoxysilane, phenylaminopropyltrimethoxysilane, glycidylpropyltriethoxysilane, methacryloxypropyltrimethoxysilane, and vinyltriethoxysilane, ureidosilane, sulfide silane, vinylsilane, and imidazolesilane.

The sizing agent is an epoxy resin, such as bisphenol A-type epoxy resin, or an epoxy acrylate resin having an acryl group or a methacryl group in one molecule. Preferred examples thereof include vinyl ester resins, such as bisphenol A-type vinyl ester resins, novolac-type vinyl ester resins, and brominated vinyl ester resins. Alternatively, the sizing agent may be an urethane-modified resin of an epoxy resin or a vinyl ester resin.

<Production of Polyimide Resin-Fiber Composite Material>

The polyimide resin (A) is overlaid with the fiber material (B). Subsequently, the whole amount or at least a portion of the polyimide resin (A) is melted by applying heat and pressure so that the fiber material (B) layer is impregnated with the polyimide resin (A). This impregnated product is consolidated (compacted) into a composite material by applying heat and pressure.

The polyimide resin (A) may be prepared, in any form, such as a film, fibrous, powder, or pellet form, into a composite with the fiber material (B) and is preferably in a film, fibrous, or powder form, and particularly preferably in a film or fibrous form, in consideration of moldability, impregnating properties and the like.

A known method may be adopted for preparing the polyimide resin (A) in a film or fibrous form. For example, the polyimide resin (A) in this form is produced by a method, for example, fiber production by melt spinning from polyimide resin pellets, continuous film formation by the extrusion of the resin from an extruder, or film formation with a heat pressing machine.

For processing the polyimide resin (A) into a film, it is also preferred to form a film by adopting a method for embossing a film surface. Particularly, this approach is effective when the polyimide resin to be processed into a thin film tends to be broken under minor stress or unequal stress during the processing by molding. It is considered that a film having an embossed surface, i.e., a grained surface with fine surface asperities, may be prevented from being broken, because the frictional resistance between the film surface and a take-off machine, i.e., a roll or the like, may be decreased during the film formation so that the stress applied to the film is controlled uniformly to a low extent. In addition, for take-up in a roll form, the friction between film surfaces may be reduced, and the film may be taken up without being wrinkled. Also, the film may be prevented from being broken, by relaxing the stress during the take-up. When the film roll is subjected to after-processing, such as slitting into an arbitrary width or lamination with another film by dry lamination, the film is prevented from being broken, by preventing its friction with an apparatus. Thus, productivity may be improved.

The grain may be disposed only on one side or may be disposed on both sides, and is preferably disposed on both surfaces on front and back sides.

The grain refers to a grain pattern in a broad sense and includes a surface with fine asperities having difference in height, such as leather grain, pearskin finish, wood grain, grey, a wrinkle pattern, and rock eyes.

The film of the polyimide resin (A) thus obtained has a thickness of preferably from 5 to 200 μm, more preferably from 10 to 150 μm, and further preferably from 10 to 120 μm. When the thickness exceeds 200 μm, the resulting polyimide resin film has too large a thickness, which then deteriorates the impregnating properties for the fiber material (B) or increases the amount of curvature, making it difficult to obtain the composite material of interest. The lower limit thereof is preferably 5 μm, in terms of productivity.

In the case of using the polyimide resin (A) as a fibrous material, the fibrous material may be a fiber, a monofilament, a multifilament, a thread, a twist yarn, a twist yarn, a string, an oriented yarn, a rope, a material having change in denier in the longitudinal direction, a material having a roughened fiber surface, or their woven products, a yarn, a non-woven fabric or the like.

The fiber fineness of the polyimide resin (A) is preferably from 10 to 200 tex, in terms of total fineness. The total fineness is more preferably from 20 to 150 tex, and further preferably from 30 to 100 tex. The monofilament fineness is preferably from 0.1 to 3 tex, more preferably from 0.3 to 2 tex, and further preferably from 0.5 to 1 tex.

The total fineness may be determined in terms of weight per 1,000 m by measuring the weight of a multifilament having an arbitrary length. The monofilament fineness may be determined by dividing the total fineness by the number of fibers of the multifilament.

The tensile strength of the fiber is preferably from 1 to 20 gf/d, more preferably from 2 to 15 gf/d, and further preferably from 3 to 10 gf/d.

Among these, the fiber of the polyimide resin (A) is preferably a multifilament having a tensile strength of from 2 to 10 gf/d.

The tensile strength may be determined as strength per unit fineness by subjecting the multifilament to a tensile test with a tensile testing machine under conditions of 23° C. and 50% RH and dividing the maximum stress by the fineness.

When the polyimide resin (A) is in a film or fibrous form, the step of impregnating the fiber material (B) with the polyimide resin (A) is preferably performed by continuously applying pressure with plural rolls in a heated atmosphere. The continuous application of pressure is capable of pushing air contained in the fiber material (B) out of the composite material or a molded article obtained by molding this composite material, and is capable of decreasing voids in the composite material or the molded article obtained by molding this composite material.

The material of the roll is not particularly limited, and a roll with its surface coated with a fluorine resin is preferably used for preventing the adhesion of the polyimide resin (A) to the roll during the application of heat and pressure.

When the polyimide resin (A) is a powder, the powder of the polyimide resin (A) may be dispersed in the surface of the fiber material (B) and then melted by applying pressure with a roll in a heated atmosphere or by laser irradiation so that the fiber material (B) is impregnated with the polyimide resin (A).

When the aforementioned step of applying pressure adopts the step of applying pressure to the film or fiber of the polyimide resin (A) and the fiber material (B) wound around a bobbin while opening them, or adopts the step of applying pressure while unreeling the monofilament fiber material (B) wound around a bobbin, the average fiber diameter of the fiber material (B) is preferably from 1 to 100 μm, more preferably from 3 to 50 μm, further preferably from 4 to 20 μm, and particularly preferably from 5 to 10 μm.

The application of heat and pressure may be performed to two or more superimposed layers of the film or fiber of the polyimide resin (A) overlaid or laminated with the fiber material (B). In the case of such two or more superimposed layers, for example, it is desirable to superimpose at least two, and preferably five or more polyimide resin (A) film/fiber material (B) laminates such that the polyimide resin layers are positioned on both outermost sides, respectively, and to apply heat and pressure to the superimposed laminates.

The temperature for impregnating and integrating the fiber material (B) layer with the polyimide resin (A) by applying heat and pressure needs to be equal to or higher than the temperature at which the polyimide resin (A) is softened and melted. This temperature differs depending on the type or molecular weight of the polyimide resin (A) and is preferably from 340 to 400° C., and more preferably from 350 to 380° C. The application of heat and pressure in such a temperature range tends to further improve the impregnation of the fiber material (B) with the polyimide resin (A) and to improve the physical properties of the composite material or the molded article obtained by molding this composite material.

The press pressure for the application of pressure is preferably 0.1 MPa or more. The application of heat and pressure is preferably performed under reduced pressure, and in particular, in vacuum. The application of heat and pressure under such conditions is preferred because bubbles are less likely to remain in the resulting composite material.

In the case of further processing the composite material of the present invention into a molded article by heat melting, the exothermic amount of crystallization of the polyimide resin (A) in the composite material is preferably 5 J/g or more. When the exothermic amount of crystallization falls within this range, moldability is improved when the composite material is processed into a molded article. The composite material has moderate flexibility and favorable take-up performance when the composite material is taken up in a roll form and stored.

The composite material of the present invention thus produced may be solid, semisolid, or viscous and is not particularly limited by its form. Generally, the composite material of the present invention is solid or semisolid. Preferably, the composite material is capable of being taken up in a roll form and stored. Since the polyimide resin (A) is thermoplastic, the composite material may be further thermally processed into a molded article by various kinds of molding methods.

In the composite material according to the present invention, the polyimide resin (A)/fiber material (B) area ratio at the cross section is preferably from 20/80 to 80/20. The area ratio at the cross section is more preferably from 30/70 to 70/30, and further preferably from 40/60 to 60/40. When the fiber material (B) is oriented in one direction, the cross section refers to a cross section perpendicular to the longitudinal direction of the fiber material (B). When the fiber material (B) is oriented in plural directions, the cross section is defined as a surface perpendicular to the longitudinal direction of the fiber material (B) oriented in one direction arbitrarily selected from the plural directions. When the fiber material (B) is not oriented, the cross section is defined as arbitrary one direction of the composite material. The polyimide resin (A)/fiber material (B) area ratio may be determined by observing the cross section under a scanning electron microscope (SEM).

The polyimide resin may be melted off during the application of heat and pressure. Thus, the area ratio at the cross section of the composite material may not always be consistent with the area ratio calculated from the mass of the polyimide resin (A) used, the mass of the fiber material (B) used, and their densities. When the area ratio falls within the aforementioned range, the strength of the molded article is improved.

<Production of Molded Article from Composite Material>

The composite material obtained by the aforementioned method preferably has both surfaces respectively constituted by the polyimide resin (A) layers.

Since the composite material of the present invention consists of a thermoplastic resin material, this is used as a material for molding, either as it is or after being cut into a desired shape or size, and this may be preferably heated, subsequently molded, preferably, in a heated molding pattern, and removed from the pattern, thereby providing various kinds of molded articles. The molding is not limited to the method using a molding pattern and may be performed with, for example, a roll. The composite material may be preferably heated and subsequently molded by applying pressure, preferably, with a heated roll.

The heating temperature for heating the composite material at the time of molding is preferably from 300 to 400° C., and more preferably from 330 to 380° C. The pressure at the time of molding is preferably 0.1 MPa or more, more preferably 0.5 MPa or more, and further preferably 1 MPa or more. The temperature of the pattern (preferably, mold) at the time of molding is preferably from 150 to 260° C., and more preferably from 170 to 250° C.

The method for processing the composite material of the present invention into a molded article is not particularly limited, and a known technique may be applied. A compression molding method, a vacuum molding method, a vacuum compression molding method, a pressure molding method or the like may be used.

The molded article obtained by molding the composite material may be further heat-treated. The heat treatment of the molded article is capable of reducing curvature and further improving dimensional stability. The heat treatment temperature is preferably from 190 to 250° C.

In the molded article obtained by molding the composite material, the polyimide resin (A)/fiber material (B) area ratio at the cross section is preferably from 20/80 to 80/20. When the area ratio falls within this range, the strength of the molded article tends to be further improved. The area ratio at the cross section is more preferably from 30/70 to 70/30, and further preferably from 40/60 to 60/40. The polyimide resin (A)/fiber material (B) area ratio at the cross section of the molded article may be determined in the same way as in the measurement of the area ratio in the composite material.

The molded article obtained by molding the composite material is preferably compacted with decreased voids. The void area ratio at the cross section is preferably 5% or less, more preferably 3% or less, and further preferably 2% or less. The void area ratio at the cross section of the molded article may be determined in the same way as in the measurement of the void area ratio in the composite material.

The fiber length of the fiber material (B) present in the molded article obtained by molding the composite material is preferably 1 cm or more, more preferably 1.5 cm or more, further preferably 2 cm or more, and particularly preferably 3 cm or more, in terms of average fiber length. The upper limit of the average fiber length differs depending on use application and is preferably 500 cm or less, more preferably 300 cm or less, and further preferably 100 cm or less.

The method for measuring the average fiber length in the molded article is not particularly limited, and the average fiber length may be determined, for example, by placing the composite material in hexafluoroisopropanol (HFIP) or concentrated sulfuric acid and measuring the lengths of fibers remaining after the dissolution of the polyimide resin. The lengths of the fibers may be measured by visual observation or in some cases, observation under an optical microscope, a scanning electron microscope (SEM) or the like. 100 fibers are selected at random, and their lengths are measured. A number-average fiber length may be calculated.

For the use application of the molded article that particularly requires surface smoothness or high class, the resulting molded article is preferably further provided on its surface with a polyimide resin layer. Examples of the method for providing the polyimide resin layer include a method which involves laminating a polyimide resin film on the surface of the molded article and fusing them by heating, a method which involves dipping the molded article in a melted polyimide resin, and a method which involves coating the molded article with a polyimide resin powder, followed by fusion.

In the case of further providing the polyimide resin layer on the surface of the molded article, the thickness of the polyimide layer is preferably from 1 to 1,000 μm, more preferably from 3 to 500 μm, and particularly preferably from 5 to 100 μm.

The resin for use in the polyimide resin layer is preferably the polyimide resin (A).

<Other Components for Polyimide Resin (A)>

In the case of the composite material of the present invention, the polyimide resin (A) also preferably contains a chopped fiber (D) of the fiber material (B). The chopped fiber (D) of the fiber material (B) refers to a fiber having an average fiber length shorter than that of the fiber material (B) and preferably has an average fiber diameter smaller than that of the fiber material (B). Specifically, typical examples thereof include so-called chopped strands. Preferred examples thereof include fibers having an average fiber diameter of from 1 to 100 μm, and in particular, from 3 to 50 μm, and an average fiber length of from 0.02 to 30 mm, and in particular, from 0.1 to 20 mm. The chopped fiber (D) is preferably compounded in advance in the polyimide resin (A). The chopped fiber (D) may be of the same or different kind as or from the fiber material (B), and the same kind of the chopped fiber (D) as the fiber material (B) is preferably used.

In the case of the composite material of the present invention, the polyimide resin (A) may be further supplemented with, for example, an additive, such as an antioxidant, a stabilizer (e.g., a thermal stabilizer), a weathering stabilizer, a delusterant, a ultraviolet absorber, a nucleating agent, a plasticizer, a dispersant, a flame retardant, an antistatic agent, an anti-coloring agent, an anti-gelling agent, a colorant, or a mold release agent, without impairing the effects of the present invention.

Among those described above, a stabilizer (an antioxidant or a thermal stabilizer) is preferably mixed therewith. The stabilizer is preferably, for example, an organic stabilizer, such as a phosphorus-based, hindered phenol-based, hindered amine-based, oxalic acid anilide-based, organic sulfur-based, or aromatic secondary amine-based stabilizer, or an inorganic stabilizer, such as an amine-based antioxidant, a copper compound, or a halide. The phosphorus-based stabilizer is preferably a phosphite compound or a phosphonite compound.

Among these stabilizers, an amine-based antioxidant or an inorganic, organic sulfur-based, or aromatic secondary amine-based stabilizer is particularly preferred, in terms of processing stability during the application of heat and pressure, heat aging resistance, film appearance, and prevention of coloring.

The content of the stabilizer is generally from 0.01 to 1 part by mass, and preferably from 0.01 to 0.8 parts by mass, with respect to 100 parts by mass of the polyimide resin (A). When the content is 0.01 parts by mass or more, the effects of improving heat discoloration and improving weather resistance or light resistance may be sufficiently exerted. When the content is 1 part by mass or less, reduction in mechanical physical properties may be suppressed.

EXAMPLES

The present invention will be described in more detail with reference to examples below, but the present invention is not limited thereto. Various measurements and evaluations in each Production Example, Example, and Reference Example were carried out in the following manners.
<Logarithmic Viscosity μ>
The logarithmic viscosity of the polyimide resin was measured in such a manner that the resulting polyimide resin was dried at from 190 to 200° C. for 2 hours, and 0.100 g of the polyimide resin was dissolved in 20 mL of concentrated sulfuric acid (96%, produced by Kanto Chemical Co., Inc.), and measured at 30° C. with a Cannon-Fenske viscometer. The logarithmic viscosity p was obtained according to the following expression.

$$\mu = \ln(ts/t_0)/C$$

$t_0$: elapsed time for flowing concentrated sulfuric acid
ts: elapsed time for flowing polyimide resin solution
C: 0.5 g/dL
<Melting Point, Glass Transition Temperature, and Crystallization Temperature>
The melting point, the glass transition temperature and the crystallization temperature of the polyimide resin were measured with a differential scanning calorimeter ("DSC-6220", produced by SII Nanotechnology, Inc.). The polyimide resin was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point was determined by reading the peak top value of the endothermic peak observed in the first heating or the second heating. The glass transition temperature was determined by reading the value observed in the first heating or the second heating. The crystallization temperature was also determined by reading the peak top value of the exothermic peak observed in the first cooling.

In the present example, the melting point in the first heating was expressed as $Tm_0$, the melting point in the second heating was expressed as Tm, the glass transition temperature in the first heating was expressed as $Tg_0$, the glass transition temperature in the second heating was expressed as Tg, the crystallization temperature in the first heating was expressed as $Tc_0$, and the crystallization temperature in the first cooling was expressed as Tc.
<Crystallization Half-Time>
The crystallization half-time of the polyimide resin was measured with a differential scanning calorimeter ("DSC-6220", produced by SII Nanotechnology, Inc.).

A polyimide resin having a crystallization half-time of 20 seconds or less was measured under such conditions that in a nitrogen atmosphere, the polyimide resin was held at 420° C. for 10 minutes for melting the polyimide resin completely, and then quenched at a cooling rate of 70° C./min, during which the time required from the appearance of the crystallization peak observed to the peak top thereof was calculated for determining the crystallization half-time.
<Infrared Spectroscopy (IR Measurement)>
The IR measurement of the polyimide resin was performed with "JIR-WINSPEC 50", produced by JEOL, Ltd.
<1% Decomposition Temperature>
The 1% decomposition temperature of the polyimide resin was measured with a thermogravimetry/differential thermal analyzer ("TG/DTA-6200", produced by SII Nanotechnology, Inc.). Such a temperature that a weight loss of 1% with respect to the initial weight occurred on measuring at a heating rate of 10° C./min in the air atmosphere was defined as the 1% decomposition temperature ($Td_1$).
<Lab Value and YI Value>
In Reference Examples and Examples, particles having a particle size of from 90 μm to 25 μm were isolated from the resulting resin powder according to the method of JIS K0069 using sieves for the JIS test (sieves with a mesh opening of 106 μm and with a mesh opening of 25 μm: JIS sieves). This classification operation is aimed at minimizing the influence of difference in particle size on hue by comparing equivalent particle sizes. This resin powder was dried at 190° C. for 10 hours, and the Lab value and the YI value were measured with a differential colorimeter ("ZE2000", produced by Nippon Denshoku Kogyo Industries Co., Ltd.). The measurement was performed by a reflection method.

L represents lightness, and a larger value means a higher degree of whiteness. a represents the degree of red-green, and a larger value means stronger redness while a smaller value means stronger greenishness. b represents the degree of yellow-blue, and a larger value means stronger yellowishness while a smaller value means stronger bluishness. YI represents the yellow index, and a smaller value means weaker yellowishness and a better hue.
<Oxygen Index>
The oxygen index was measured with the molded article mentioned later (80 mm×10 mm×4 mm thick) as a test specimen according to the method of JIS K7201-2. The measurement apparatus was Candle Type Flammability Tester, Model D (produced by Toyo Seiki Seisaku-Sho, Ltd.).

Example A

Example A-1

(1) Production Method
650 g of 2-(2-methoxyethoxy)ethanol (produced by Nippon Nyukazai Co., Ltd.) and 257.75 g (1.181 mol) of pyromellitic dianhydride (produced by Mitsubishi Gas Chemical Co., Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 86.75 g (0.6098 mol) of 1,3-bis(aminomethyl)cyclohexane (produced by Mitsubishi Gas Chemical Co., Inc.), 54.86 g (0.4924 mol) of 1,6-hexamethylenediamine (produced by Wako Pure Chemical Industries, Ltd.), and 22.53 g (0.07034 mol) of 2,2'-bis(trifluoromethyl)benzidine (produced by Wakayama Seika Kogyo Co., Ltd.) were dissolved in 250 g of 2-(2-methoxyethoxy)ethanol with a 500 ml beaker, thereby preparing a mixed diamine solution. This mixed diamine solution was gradually added thereto with a plunger pump. This dropwise addition was carried out in a nitrogen flow state over the whole period. The number of rotations of the agitation blade was set to 250 rpm. After the completion of the dropwise addition, 100 g of 2-(2-methoxyethoxy)ethanol and 1.882 g (0.0176 mol) of benzylamine (produced by Kanto Chemical Co., Inc.) were added thereto, and the mixture was further agitated. At this stage, a pale yellow clear homogenous polyamic acid solution was obtained.

Next, the agitation speed was set to 200 rpm, and the polyamic acid solution in the 2 L separable flask was then heated to 190° C. In this heating process, the deposition of a polyimide powder and dehydration associated with imidization were confirmed at a solution temperature of from 130 to 150° C. The solution was kept at 190° C. for 30 minutes, then allowed to cool to room temperature, and filtered.

The obtained polyimide powder was washed with 300 g of 2-(2-methoxyethoxy)ethanol and 300 g of methanol (produced by Mitsubishi Gas Chemical Co., Inc.), filtered, and then dried at 190° C. for 10 hours with a drier, thereby providing 367 g of a powder of polyimide 1. This powder was milky white.

The measurement of the polyimide 1 with DSC revealed that $Tm_0$ was observed at 334° C. in the first heating. $Tg_0$ and $Tc_0$ were not clearly observed (i.e., which meant that the polyimide had high crystallinity). In the cooling, Tc was observed at 295° C. (exothermic amount: 8.5 mJ/mg), which confirmed that the polyimide had high crystallinity. In the second heating, Tg was observed at 222° C., and Tm was observed at 345° C. The crystallization half-time measured was 20 seconds or less. The 1% decomposition temperature was 411° C., and the logarithmic viscosity was 0.62 dL/g. The measurement of the IR spectrum showed the characteristic absorption of an imide ring ν(C=O) observed at 1,771 and 1,697 (cm$^{-1}$). This powder was classified with the JIS sieves, and Lab and YI of the resulting powder were measured by the aforementioned method. The results are shown in Table 1.

The a, b, and YI values were confirmed to be remarkably decreased as compared with Reference Example A-1 mentioned later.

Example A-2

(1) Production Method 650 g of 2-(2-methoxyethoxy)ethanol (produced by Nippon Nyukazai Co., Ltd.) and 257.75 g (1.180 mol) of pyromellitic dianhydride (produced by Mitsubishi Gas Chemical Co., Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 83.96 g (0.5902 mol) of 1,3-bis(aminomethyl)cyclohexane (produced by Mitsubishi Gas Chemical Co., Inc.), 54.86 g (0.4722 mol) of 1,6-hexamethylenediamine (produced by Wako Pure Chemical Industries, Ltd.), and 37.80 g (0.1180 mol) of 2,2'-bis(trifluoromethyl)benzidine (produced by Wakayama Seika Kogyo Co., Ltd.) were dissolved in 250 g of 2-(2-methoxyethoxy)ethanol with a 500 ml beaker, thereby preparing a mixed diamine solution. This mixed diamine solution was gradually added thereto with a plunger pump. This dropwise addition was carried out in a nitrogen flow state over the whole period. The number of rotations of the agitation blade was set to 250 rpm. After the completion of the dropwise addition, 100 g of 2-(2-methoxyethoxy)ethanol and 1.882 g (0.0176 mol) of benzylamine (produced by Kanto Chemical Co., Inc.) were added thereto, and the mixture was further agitated. At this stage, a pale yellow clear homogenous polyamic acid solution was obtained.

Next, the agitation speed was set to 200 rpm, and the polyamic acid solution in the 2 L separable flask was then heated to 190° C. In this heating process, the deposition of a polyimide powder and dehydration associated with imidization were confirmed at a solution temperature of from 130 to 150° C. The solution was kept at 190° C. for 30 minutes, then allowed to cool to room temperature, and filtered.

The obtained polyimide resin powder was washed with 300 g of 2-(2-methoxyethoxy)ethanol and 300 g of methanol (produced by Mitsubishi Gas Chemical Co., Inc.), filtered, and then dried at 190° C. for 10 hours with a drier, thereby providing 371 g of a powder of polyimide 2. This powder was milky white.

The measurement of the polyimide 2 with DSC revealed that in the first heating, $Tm_0$ was observed at 326° C. while a shoulder peak was observed around 341° C., but $Tg_0$ and $Tc_0$ were not clearly observed (which meant that the polyimide had high crystallinity). In the cooling, Tc was observed at 301° C. (exothermic amount: 5.6 mJ/mg), which confirmed that the polyimide had high crystallinity. In the second heating, Tg was observed at 229° C., and Tm was observed at 337° C., while a shoulder peak was observed at 352° C. The crystallization half-time measured was 20 seconds or less. The 1% decomposition temperature was 414° C., and the logarithmic viscosity was 0.61 dL/g. The measurement of the IR spectrum showed the characteristic absorption of an imide ring ν(C=O) observed at 1,771 and 1,697 (cm-1). This powder was classified with the JIS sieves, and Lab and YI of the resulting powder were measured by the aforementioned method. The results are shown in Table 1.

The a, b, and YI values were confirmed to be remarkably decreased as compared with Reference Example A-1 mentioned later.

Example A-3

371 g of a powder of polyimide 3 was obtained by synthesis in the same way as in Example A-1 except that the mixed diamine was prepared by changing the amount of 1,3-bis(aminomethyl)cyclohexane to 86.75 g (0.6098 mol), the amount of 1,6-hexamethylenediamine to 57.22 g (0.4924 mol), and 2,2'-bis(trifluoromethyl)benzidine to 36.47 g (0.07035 mol) of 2,2-bis[4-(4-aminophenoxy)phenyl]hexafluoropropane (produced by Wakayama Seika Kogyo Co., Ltd.). This powder was milky white.

The measurement of the polyimide 3 with DSC revealed that $Tm_0$ was observed at 318° C. in the first heating, but $Tg_0$ and $Tc_0$ were not clearly observed (which meant that the polyimide had high crystallinity). In the cooling, Tc was observed at 250° C. (exothermic amount: 7.4 mJ/mg), which confirmed that the polyimide had high crystallinity. In the second heating, Tg was observed at 219° C., and Tm was observed at 337° C. The crystallization half-time measured was 20 seconds or less. The 1% decomposition temperature was 401° C., and the logarithmic viscosity was 0.59 dL/g. The measurement of the IR spectrum showed the characteristic absorption of an imide ring ν(C=O) observed at 1,771 and 1,697 (cm$^{-1}$). This powder was classified with the JIS sieves, and Lab and YI of the resulting powder were measured by the aforementioned method. The results are shown in Table 1.

The a, b, and YI values were confirmed to be remarkably decreased as compared with Reference Example A-1 mentioned later.

Example A-4

650 g of 2-(2-methoxyethoxy)ethanol (produced by Nippon Nyukazai Co., Ltd.) and 163.59 g (0.750 mol) of pyromellitic dianhydride (produced by Mitsubishi Gas Chemical Co., Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 40.15 g (0.2820 mol) of 1,3-bis(aminomethyl)cyclohexane (produced by Mitsubishi Gas Chemical Co., Inc.), 72.89 g (0.4230 mol) of 1,10-decamethylenediamine (produced by Kokura Synthetic Industries, Ltd.), and 14.41 g (0.0450 mol) of 2,2'-bis(trifluoromethyl)benzidine (produced by Wakayama Seika Kogyo Co., Ltd.) were dissolved in 250 g of 2-(2-methoxyethoxy)ethanol with a 500 mL beaker, thereby preparing a mixed diamine solution. This mixed diamine solution was gradually added thereto with a plunger pump. This dropwise addition of the mixed diamine solution was carried out in a nitrogen flow state over the whole period. The number of rotations of the agitation blade was set to 250 rpm. After the completion of the dropwise addition, 100 g of 2-(2-methoxyethoxy)ethanol and 1.19 g (0.0112 mol) of benzylamine (produced by Kanto Chemical Co., Inc.) were added thereto, and the mixture was further agitated. At this stage, a yellow clear homogenous polyamic acid solution was obtained.

Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 130 to 150° C. The solution was kept at 190° C. for 30 minutes, then allowed to cool to room temperature, and filtered.

The obtained polyimide resin powder was washed with 300 g of 2-(2-methoxyethoxy)ethanol and 300 g of methanol, filtered, and then dried at 190° C. for 10 hours with a drier, thereby providing 248 g of a milky white powder of polyimide 4.

The measurement of the polyimide 4 with DSC revealed that only Tg and $Tm_0$ were observed at 190° C. and 271° C., respectively, in the first heating, but $Tc_0$ was not clearly observed (which meant that the polyimide had high crystallinity). In the cooling, Tc was observed at 245° C. (exothermic amount: 12.0 mJ/mg), which confirmed that the polyimide had high crystallinity. In the second heating, Tg was observed at 186° C., and Tm was observed at 273° C. The crystallization half-time measured was 20 seconds or less. The 1% decomposition temperature was 383° C., and the logarithmic viscosity was 0.69 dL/g. The measurement of the IR spectrum showed the characteristic absorption of an imide ring $v(C=O)$ observed at 1,771 and 1,699 $(cm^{-1})$. This powder was classified with the JIS sieves, and Lab and YI of the resulting powder were measured by the aforementioned method. The results are shown in Table 1.

The a, b, and YI values were confirmed to be remarkably decreased as compared with Reference Example A-1 mentioned later.

Example A-5

650 g of 2-(2-methoxyethoxy)ethanol (produced by Nippon Nyukazai Co., Ltd.) and 163.59 g (0.750 mol) of pyromellitic dianhydride (produced by Mitsubishi Gas Chemical Co., Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 40.15 g (0.2820 mol) of 1,3-bis(aminomethyl)cyclohexane (produced by Mitsubishi Gas Chemical Co., Inc.), 84.76 g (0.4230 mol) of 1,12-dodecamethylenediamine (produced by Kokura Synthetic Industries, Ltd.) and 14.41 g (0.0450 mol) of 2,2'-bis(trifluoromethyl)benzidine (produced by Wakayama Seika Kogyo Co., Ltd.) were dissolved in 250 g of 2-(2-methoxyethoxy)ethanol with a 500 mL beaker, thereby preparing a mixed diamine solution. This mixed diamine solution was gradually added thereto with a plunger pump. This dropwise addition of the mixed diamine solution was carried out in a nitrogen flow state over the whole period. The number of rotations of the agitation blade was set to 250 rpm. After the completion of the dropwise addition, 100 g of 2-(2-methoxyethoxy)ethanol and 1.19 g (0.0112 mol) of benzylamine (produced by Kanto Chemical Co., Inc.) were added thereto, and the mixture was further agitated. At this stage, a yellow clear homogenous polyamic acid solution was obtained.

Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 130 to 150° C. The solution was kept at 190° C. for 30 minutes, then allowed to cool to room temperature, and filtered.

The obtained polyimide resin powder was washed with 300 g of 2-(2-methoxyethoxy)ethanol and 300 g of methanol, filtered, and then dried at 190° C. for 10 hours with a drier, thereby providing 259 g of a milky white powder of polyimide 5.

The measurement of the polyimide 5 with DSC revealed that only Tg and $Tm_0$ were observed at 198° C. and 252° C., respectively, in the first heating, but $Tc_0$ was not clearly observed (i.e., which meant that the polyimide had high crystallinity). In the cooling, Tc was observed at 218° C. (exothermic amount: 17.3 mJ/mg), which confirmed that the polyimide had high crystallinity. In the second heating, Tg was observed at 180° C., and Tm was observed at 252° C. The crystallization half-time measured was 20 seconds or less. The 1% decomposition temperature was 379° C., and the logarithmic viscosity was 0.68 dL/g. The measurement of the IR spectrum showed the characteristic absorption of an imide ring $v(C=O)$ observed at 1,771 and 1,699 $(cm^{-1})$. This powder was classified with the JIS sieves, and Lab and YI of the resulting powder were measured by the aforementioned method. The results are shown in Table 1.

The b and YI values were confirmed to be remarkably decreased as compared with Reference Example A-1 mentioned later.

Reference Example A-1

(1) Production Method 650 g of 2-(2-methoxyethoxy)ethanol (produced by Nippon Nyukazai Co., Ltd.) and 257.75 g (1.180 mol) of pyromellitic dianhydride (produced by Mitsubishi Gas Chemical Co., Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 83.96 g (0.5902 mol) of 1,3-bis(aminomethyl)cyclohexane (produced by Mitsubishi Gas Chemical Co., Inc.), 54.86 g (0.4722 mol) of 1,6-hexamethylenediamine (produced by Wako Pure Chemical Industries, Ltd.), and 23.64 g (0.1180 mol) of 4,4'-diaminodiphenyl ether (produced by Wakayama Seika Kogyo Co., Ltd.) were dissolved in 250 g of 2-(2-methoxyethoxy)ethanol with a 500 ml beaker, thereby preparing a mixed diamine solution. This mixed diamine solution was added dropwise to the suspended solution in the 2 L separable flask over 60 minutes with a plunger pump. This dropwise addition was carried out in a nitrogen flow state over the whole period. The number of rotations of the agitation blade was set to 250 rpm. After the completion of the dropwise addition, 100 g of 2-(2-methoxyethoxy)ethanol and 1.897 g (0.0177 mol) of benzylamine (produced by Kanto Chemical Co., Inc.) were added thereto, and the mixture was further agitated for 10 minutes. At this stage, a yellow clear homogenous polyamic acid solution was obtained.

Next, the agitation speed was set to 200 rpm, and the polyamic acid solution in the 2 L separable flask was then heated to 190° C. In this heating process, the deposition of a polyimide powder and dehydration associated with imidization were confirmed at a solution temperature of from 130 to 150° C. The solution was kept at 190° C. for 30 minutes, then allowed to cool to room temperature, and filtered. The obtained polyimide powder was washed with 300 g of 2-(2-methoxyethoxy)ethanol and 300 g of methanol (produced by Mitsubishi Gas Chemical Co., Inc.), filtered, and then dried at 190° C. for 10 hours with a drier, thereby providing 360 g of a powder of polyimide 4.

The measurement of the polyimide 4 with DSC revealed that only $Tm_0$ was observed at 338° C. in the first heating, but $Tg_0$ and $Tc_0$ were not clearly observed (which meant that the polyimide had high crystallinity). In the cooling, Tc was observed at 308° C. (exothermic amount: 12.0 mJ/mg), which confirmed that the polyimide had high crystallinity. In the second heating, Tg was observed at 226° C., and Tm was observed at 335° C. The crystallization half-time measured was 20 seconds or less. The 1% decomposition temperature was 411° C., and the logarithmic viscosity was 0.63 dL/g. The measurement of the IR spectrum showed the characteristic absorption of an imide ring ν(C=O) observed at 1,771 and 1,699 (cm$^{-1}$). This powder was classified with the JIS sieves, and Lab and YI of the resulting powder were measured by the aforementioned method. The results are shown in Table 1.

TABLE 1

|  |  | Reference Example A-1 | Example A-1 | Example A-2 | Example A-3 | Example A-4 | Example A-5 |
|---|---|---|---|---|---|---|---|
| Hue evaluation | L | 77.79 | 91.25 | 90.83 | 81.72 | 88.14 | 84.15 |
|  | a | 5.67 | −1.64 | −2.36 | 5.53 | 3.05 | 7.15 |
|  | b | 28.25 | 19.18 | 23.14 | 20.1 | 16.28 | 14.71 |
|  | YI | 70.47 | 36.55 | 43.97 | 49.1 | 35.75 | 37.59 |
| Thermal property | Tm/° C. | 335 | 345 | 337 | 337 | 273 | 252 |
|  | Tg/° C. | 226 | 222 | 229 | 219 | 186 | 180 |
|  | Td$_{1\%}$/° C. | 411 | 411 | 414 | 401 | 383 | 379 |

Example B

Example B-1

650 g of 2-(2-methoxyethoxy)ethanol (produced by Nippon Nyukazai Co., Ltd.) and 257.75 g (1.180 mol) of pyromellitic dianhydride (produced by Mitsubishi Gas Chemical Co., Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 83.96 g (0.5902 mol) of 1,3-bis(aminomethyl)cyclohexane (produced by Mitsubishi Gas Chemical Co., Inc.), 54.86 g (0.4722 mol) of 1,6-hexamethylenediamine (produced by Wako Pure Chemical Industries, Ltd.), and 29.31 g (0.1180 mol) of 4,4'-diaminodiphenylsulfone were dissolved in 250 g of 2-(2-methoxyethoxy)ethanol with a 500 mL beaker, thereby preparing a mixed diamine solution. This mixed diamine solution was gradually added thereto with a plunger pump. This dropwise addition of the mixed diamine solution was carried out in a nitrogen flow state over the whole period. The number of rotations of the agitation blade was set to 250 rpm. After the completion of the dropwise addition, 100 g of 2-(2-methoxyethoxy)ethanol and 1.897 g (0.0177 mol) of benzylamine (produced by Kanto Chemical Co., Inc.) were added thereto, and the mixture was further agitated. At this stage, a yellow clear homogenous polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 130 to 150° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 190° C. for 10 hours with a drier, thereby providing 352 g of a powder of polyimide resin 1.

The measurement of the polyimide resin 1 with DSC revealed that only $Tm_0$ was observed at 326° C. in the first heating, but $Tg_0$ and $Tc_0$ were not clearly observed (which meant that the polyimide had high crystallinity). In the cooling, Tc was observed at 289° C. (exothermic amount: 11.3 mJ/mg), which confirmed that the polyimide had high crystallinity. In the second heating, Tg was observed at 222°

C., and Tm was observed at 340° C. The crystallization half-time measured was 20 seconds or less. The 1% decomposition temperature was 401° C., and the logarithmic viscosity was 0.61 dL/g. The measurement of the IR spectrum showed the characteristic absorption of an imide ring $\nu(C=O)$ observed at 1,771 and 1,699 (cm$^{-1}$).

The resulting powder of polyimide resin 1 was extruded at a barrel temperature of 350° C. and a screw rotation speed of 70 rpm with Labo Plasto Mill (produced by Toyo Seiki Seisaku-Sho, Ltd.). A strand extruded from the extruder was cooled in air and then pelletized with a pelletizer ("Fan Cutter FC-Mini-4/N", produced by Hoshi Plastic Co., Ltd.). The resulting pellets were dried at 190° C. for 10 hours and then used in injection molding. The injection molding was performed at a barrel temperature of 360° C. and a mold temperature of 170° C. with an injection molding machine ("HAAKE MiniJet II", produced by Thermo Fisher Scientific K.K.), thereby preparing a molded article (80 mm×10 mm×4 mm thick). This molded article was used as a test specimen and subjected to the oxygen index measurement by the method mentioned above. The oxygen index was 26.4.

Example B-2

360 g of a powder of polyimide resin 2 was obtained in the same way as in Example B-1 except that the mixed diamine was prepared by changing the amount of 1,3-bis(aminomethyl)cyclohexane to 77.24 g (0.5430 mol), the amount of 1,6-hexamethylenediamine to 46.64 g (0.4013 mol), and the amount of 4,4'-diaminodiphenylsulfone to 58.62 g (0.2361 mol). Various thermal properties of the resulting powder of polyimide resin 2 were measured in the same way as in Example B-1. The measurement of the polyimide resin 2 with DSC revealed that only $Tm_0$ was observed at 323° C. in the first heating, but $Tg_0$ and $Tc_0$ were not clearly observed (which meant that the polyimide had high crystallinity). In the cooling, Tc was observed at 285° C. (exothermic amount: 6.4 mJ/mg), which confirmed that the polyimide had high crystallinity. In the second heating, Tg was observed at 227° C., and Tm was observed at 330° C. The crystallization half-time measured was 20 seconds or less. The 1% decomposition temperature was 408° C., and the logarithmic viscosity was 0.63 dL/g. The measurement of the IR spectrum showed the characteristic absorption of an imide ring $\nu(C=O)$ observed at 1,771 and 1,697 (cm$^{-1}$). A molded article was prepared in the same way as in Example B-1 with the powder of polyimide resin 2 and subjected to oxygen index measurement. The oxygen index was 26.4. The results are shown in Table 2.

Example B-3

350 g of a powder of polyimide resin 3 was obtained in the same way as in Example 1 except that the mixed diamine was prepared by changing the amount of 1,3-bis(aminomethyl)cyclohexane to 86.75 g (0.6098 mol), the amount of 1,6-hexamethylenediamine to 57.22 g (0.4924 mol), and 4,4'-diaminodiphenylsulfone to 18.29 g (0.07034 mol) of siloxanediamine (PAM-E (produced by Shin-Etsu Chemical Co., Ltd.), functional group equivalent: 130 g/mol). Various thermal properties of the resulting powder of polyimide resin 3 were measured in the same way as in Example B-1. The measurement of the polyimide resin 3 with DSC revealed that only $Tm_0$ was observed at 335° C. in the first heating, but $Tg_0$ and $Tc_0$ were not clearly observed (which meant that the polyimide had high crystallinity). In the cooling, Tc was observed at 283° C. (exothermic amount: 15.6 mJ/mg), which confirmed that the polyimide had high crystallinity. In the second heating, Tg was observed at 204° C., and Tm was observed at 331° C. The crystallization half-time measured was 20 seconds or less. The 1% decomposition temperature was 402° C., and the logarithmic viscosity was 0.52 dL/g. The measurement of the IR spectrum showed the characteristic absorption of an imide ring $\nu(C=O)$ observed at 1,771 and 1,697 (cm$^{-1}$). A molded article was prepared in the same way as in Example B-1 with the powder of polyimide resin 3 and subjected to oxygen index measurement. The oxygen index was 23.5. The results are shown in Table 2.

TABLE 2

|  |  | Example B-1 | Example B-2 | Example B-3 |
|---|---|---|---|---|
| Ratio of repeating unit (mol %) | Formula (1) | 50 | 46 | 52 |
|  | Formula (2) | 40 | 34 | 42 |
|  | Formula (A) | 10 | 20 | 6 |
| Thermal property | Melting point (° C.) | 340 | 330 | 331 |
|  | Glass transition temperature (° C.) | 222 | 227 | 204 |
|  | Oxygen index | 26.4 | 26.4 | 23.5 |

INDUSTRIAL APPLICABILITY

According to the present invention, a polyimide resin that is capable of being easily processed by molding and prepared into a molded article excellent in heat resistance and low colorability or flame resistance may be provided.

The invention claimed is:
1. A polyimide resin, comprising:
a repeating structural unit represented by formula (1), a repeating structural unit represented by formula (2), and a repeating structural unit represented by formula (A):

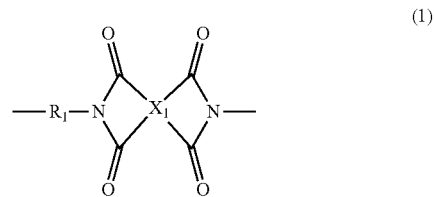

(1)

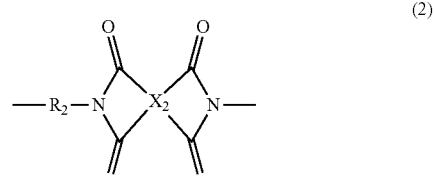

(2)

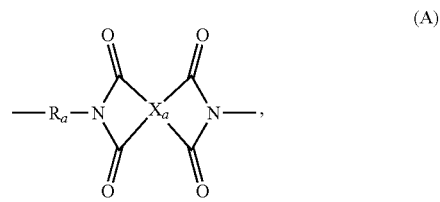

(A)

wherein:

a content ratio of the repeating structural unit of formula (1) with respect to the total of the repeating structural unit of formula (1) and the repeating structural unit of formula (2) is from 40 to 70 mol %;

a content ratio of the repeating structural unit of formula (A) with respect to the total of the repeating structural unit of formula (1) and the repeating structural unit of formula (2) is more than 0 mol % and 25 mol % or less;

$R_1$ represents a divalent group having from 6 to 22 carbon atoms and comprising an alicyclic hydrocarbon structure;

represents a divalent chain aliphatic group having from 5 to 20 carbon atoms;

$R_a$ represents a divalent group consisting of at least one aromatic ring which is bonded to at least one electron-attracting group selected from the group consisting of a nitro group, a cyano group, a p-toluenesulfonyl group, a halogen, an alkyl halide group, a phenyl group, an acyl group, an alkylene halide group, —SO— and —CONH—; and $X_1$, $X_2$, and $X_a$ each independently represent a tetravalent group having from 6 to 22 carbon atoms and comprising an aromatic ring.

2. The polyimide resin according to claim 1, wherein the electron-attracting group is a halogen, an alkyl halide group, or an alkylene halide group.

3. The polyimide resin according to claim 2, wherein the electron-attracting group is fluorine, an alkyl fluoride group, or an alkylene fluoride group.

4. The polyimide resin according to claim 1, further comprising:

a repeating structural unit represented by formula (3):

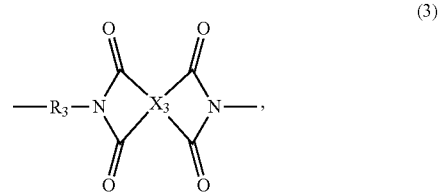

wherein:

a content ratio of the repeating structural unit of formula (3) with respect to the total of the repeating structural unit of formula (1) and the repeating structural unit of formula (2) is 25 mol % or less;

$R_3$ represents a divalent group having from 6 to 22 carbon atoms and comprising an aromatic ring; and $X_3$ represents a tetravalent group having from 6 to 22 carbon atoms and comprising an aromatic ring.

5. The polyimide resin according to claim 1, having a melting point of 360° C. or less and a glass transition temperature of 200° C. or more.

6. A film, comprising the polyimide resin according to claim 1.

7. A fiber, comprising the polyimide resin according to claim 1.

8. A heat-resistant adhesive, comprising the polyimide resin according to claim 1.

9. A composite material, comprising a fiber material impregnated with the polyimide resin according to claim 1.

* * * * *